United States Patent Office 3,165,343
Patented Jan. 12, 1965

3,165,343
BALL JOINT
Rudolf Gottschald, Osterath, Germany, assignor to A. Ehrenreich & Cie., Dusseldorf-Oberkassel, Germany
Filed June 30, 1961, Ser. No. 121,026
Claims priority, application Germany, July 6, 1960, E 19,571
2 Claims. (Cl. 287—87)

The present invention relates to a ball joint. Ball joints are known which have a housing with two coaxial openings therein. With ball joints of this type, one opening in the housing permits the passage of the ball stud through the housing and is generally known as angular displacement opening. The maximum diameter of said last mentioned opening is less than the diameter of the ball head. The diameter of the other opening in the housing exceeds that of the ball head and serves for introducing the ball head with ball stud into the housing. This last mentioned opening is closed after the ball head with ball stud has been installed.

Another heretofore known ball joint design has one housing opening only through which the ball head with ball stud is inserted into the housing. This opening is subsequently closed by a closure cap having an opening permitting angular movement of the ball stud. This design above all is not to be recommended in the construction of automobiles, because all pulling forces to be conveyed through the joint have to be absorbed by the closure cap which latter is not always safely connected to the housing.

There has also been known a design the circumference of which is provided with a longitudinally extending opening of varying width. The ball head with ball stud is introduced through said longitudinal opening at the widest portion thereof with the ball entering the housing first, whereupon the ball head with ball stud is moved to that portion where the slot-shaped opening is narrowest, thereby preventing the ball head with ball stud from accidentally dropping out of the housing.

It is an object of the present invention to provide an improved ball joint which is considerably simpler and more reliable than the above mentioned heretofore known ball joint constructions.

It is another object of this invention to provide a ball joint in which the housing is provided with a shaft and with one opening only while the ball stud may be axially aligned with the shaft of the housing.

These and other objects and advantages of the invention will appear more clearly from the following specification in connection with the accompanying drawing, in which.

Figure 1:
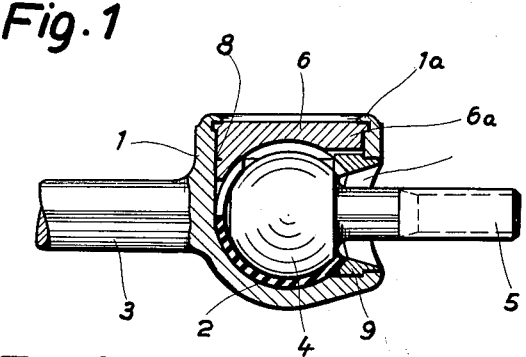
FIG. 1 illustrates a partial section through a first embodiment of a ball joint according to the present invention, in which the opening in the housing through which the ball head is inserted is substantially perpendicular to the axis of the angular displacement opening in the housing.
Figure 2:
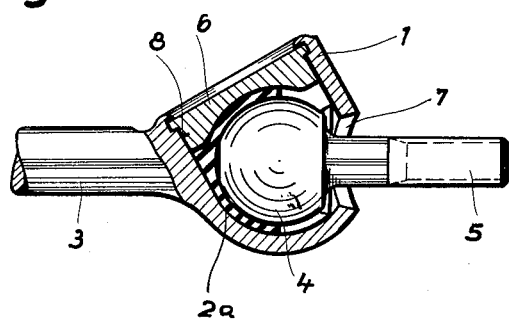
FIG. 2 is a partial section through a modified ball joint according to the present invention, in which the opening in the housing through which the ball joint is inserted is at an obtuse angle with regard to the angular displacement opening.

More specifically, the present invention concerns a ball joint employing a housing with a shaft, in which according to the embodiments of FIGS. 1 and 2 the ball stud is adapted at least approximately to be in alignment with the shaft of the housing. Such axial joints are used primarily in connection with the outer tie rods of motor vehicles steered by steering gear shafts inasmuch as in this way a bending moment on the gear shaft can be avoided to a great extent. Axial joints belong to the second of the above mentioned designs because the provision of a housing shaft will leave no space for a second housing opening.

The invention is based on the finding that an introduction of the ball head into the housing through the axial housing opening must be avoided.

According to the present invention, which concerns a ball joint provided with a housing opening permitting access to the interior of the housing for machining the same and also provided with an angular displacement opening for the ball stud, an axial ball joint is obtained which is characterized in that one opening is arranged laterally on the housing whereas the other opening is arranged axially in the housing. Both openings are so designed that it is possible to insert the ball head with the ball stud through the lateral opening of the housing and then to tilt the ball joint with the stud so that the latter will pass through the angular displacement opening while permitting the ball head properly to be located in the housing.

Referring now to the drawing in detail, the housing 1 of the ball joint has mounted therein a ball socket 2 and a ball head 4 with a ball stud 5 which protrudes from the housing 1. The housing 1 is furthermore provided with a shank 3. However, instead of providing the housing 1 with a shank 3, the housing may also be inserted into a cylindrical bore into which it may for instance be screwed. The ball socket 2 is held in housing 1 by a lid 6 which is provided with a flange 6a over which is rolled a flange 1a of the housing 1. The stud 5 as indicated above protrudes from the housing 1 through an opening 7 which may be termed angular displacement opening to permit an angular displacement of the stud 5.

As will be evident from FIGS. 1 and 2, the housing shank 3, the opening 7, and the ball stud 5 may occupy a position in which they are in axial alignment with each other. The housing 1 has a lateral opening 8 through which the ball head 4 with the ball stud 5 may be introduced whereupon the ball stud is tilted and passed through the opening 7. A ball joint according to the present invention will yield a heretofore unobtained safety against accidental movement of the ball head 4 out of the housing 1 which accidental movement has heretofore occurred in connection with accidents.

For purposes of facilitating the introduction of the ball head with ball stud into the housing, the opening 7 has inserted thereinto a ring 9 (FIG. 1).

The boring of the housing 1 for purposes of inserting the ball socket 2 may be effected through the lateral opening 8.

The arrangement of FIG. 2 differs from that of FIG. 1 in that the housing 1 has its axis arranged at an obtuse angle with regard to the longitudinal axis of stud 5. Also the ball socket 2a is somewhat differently shaped from the ball socket 2 of FIG. 1. Furthermore, the ring 9 of FIG. 1 is missing in the arrangement of FIG. 2.

Figure 3:
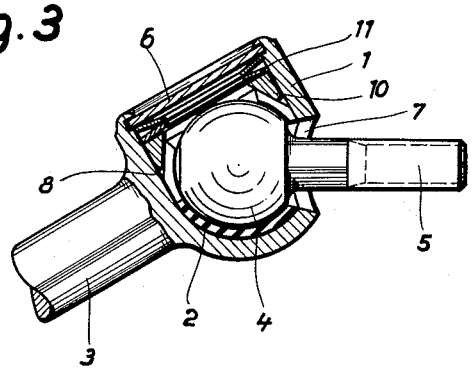
FIG. 3 represents a partial section through still another ball joint according to the present invention which is somewhat similar to that of FIG. 2 with the exception that the housing shaft is at a right angle with regard to the axis of the opening in the housing through which the ball head is introduced.

With regard to FIG. 3, it will be noted that the ball socket 2 is extended beyond the equator of the ball head while the thus formed extension is provided with slits. As will also be evident from FIG. 3, a wedge-shaped ring 10 is interposed between the housing 1 and the ball socket 2. The said ring 10 is under the continuous load of a disk spring 11 so that the joint will always remain play-free even after a longer period of operation.

While the axis of the lateral opening 8 may be at an obtuse angle or at an angle of 90° with regard to the longitudinal axis of the ball stud when the axis of the latter coincides with the axis of bore 7, the essential feature consists in the lateral introduction of the ball head with stud into the housing.

It is, of course, to be understood that the present invention is, by no means, limited to the particular constructions shown in the drawing but also comprises any modifications within the scope of the appended claims. Thus, while the ball joint according to the present invention has proved particularly advantageous in connection with axial joints, it is to be understood that it could also be used in connection with joints in which an obtuse angle is confined between the housing shank 3 and the ball stud 5 as is the case for instance in FIG. 3.

It is, of course, to be understood that before insertion of the ball head 4 with ball stud 5 the ball socket 2 is applied to and mounted on the ball head and both, the ball socket 2 and ball head 4 are inserted into the housing 1 as a unit.

What I claim is:

1. In a ball joint: a housing having a shank fixedly connected thereto, said housing also having a first opening therein for permitting the insertion of a ball head together with a ball stud therethrough, said housing also having a second opening for the passage of the ball stud only therethrough, the axis of said first opening forming an obtuse angle with the axis of said second opening and forming an acute angle with the axis of said shank, said first opening having a diameter greater than said ball head, and said second opening having a diameter less than that of said ball head but considerably greater than that of said stud so as to allow the latter to angularly move relative to the axis of said second opening.

2. In a ball joint: a housing having a shank fixedly connected thereto, said housing also having a first opening therein for permitting the insertion of a ball head together with a ball stud therethrough, said housing also having a second opening for the passage of the ball stud only therethrough, the axes of said shank and of said second opening being substantially in alignment with each other, the axis of said first opening forming an acute angle with one of said last mentioned two axes and an obtuse angle with the other one of said last mentioned two axes, said first opening having a diameter greater than said ball head, and said second opening having a diameter less than that of said ball head but considerably greater than that of said stud so as to allow the latter to angularly move relative to the axis of said second opening.

References Cited by the Examiner
UNITED STATES PATENTS

| | | |
|---|---|---|
| 79,408 | 6/68 | St. John. |
| 142,293 | 8/73 | St. John. |
| 1,870,283 | 8/32 | Crawford. |
| 2,932,534 | 4/60 | Williams. |
| 3,004,786 | 10/61 | Herbenar. |

FOREIGN PATENTS

| | | |
|---|---|---|
| 660,303 | 5/38 | Germany. |
| 725,724 | 3/55 | Great Britain. |

CARL W. TOMLIN, *Primary Examiner.*
WALTER A. SCHEEL, *Examiner.*